United States Patent [19]

Harty

[11] Patent Number: 5,308,478
[45] Date of Patent: May 3, 1994

[54] PREVENTION OF BACTERIAL GROWTH IN WATER TREATMENT SYSTEMS

[75] Inventor: William H. Harty, Daytona Beach, Fla.

[73] Assignee: United States Foundry, Inc., Port Orange, Fla.

[21] Appl. No.: 35,639

[22] Filed: Mar. 23, 1993

[51] Int. Cl.⁵ .................. B01D 35/02; C02F 1/52
[52] U.S. Cl. ........................ 210/97; 210/136; 210/287; 210/435; 210/446
[58] Field of Search .............. 210/198.1, 136, 117, 210/199, 753, 754, 287, 435, 446, 97

[56] References Cited

U.S. PATENT DOCUMENTS

| | | | |
|---|---|---|---|
| 3,184,064 | 5/1965 | Sampson et al. | 210/287 |
| 4,139,468 | 2/1979 | Rosaen | 210/130 |
| 4,980,056 | 12/1990 | Norton | 210/137 |
| 5,232,590 | 8/1993 | Reid | 210/266 |
| 5,248,417 | 9/1993 | Reid | 210/257.1 |

Primary Examiner—Neil M. McCarthy
Attorney, Agent, or Firm—Lockwood, Alex, FitzGibbon & Cummings

[57] ABSTRACT

A system and method for the prevention of bacterial growth in portions of a water treatment system which contain water from which bactericide has been removed includes a cross connect between the water containing the bactericide and the water from which the bactericide has been removed. The cross connect includes a check valve which closes to block communication between the respective waters when water is flowing through the system, and opens to permit diffusion of the bactericide from the water containing the bactericide to the water from which the bactericide has been removed when the flow of water through the system ceases.

12 Claims, 2 Drawing Sheets

PREVENTION OF BACTERIAL GROWTH IN WATER TREATMENT SYSTEMS

FIELD OF THE INVENTION

The present invention relates generally to water treatment systems and, more particularly to a system and method for prevention of the growth of bacteria in the portion of such systems which contains water which has been treated to remove bactericides.

BACKGROUND OF THE INVENTION

Systems and methods are known for the treatment of potable water to substantially reduce, if not remove all together bactericides, such as chlorine, which have previously been added to the water by the provider of the water to eliminate the undesirable taste, odor and the like which result from the bactericides. Such treatment has included connection of the water service conduit which carries the water containing the bactericides to a housing or cartridge near the water tap. The housing contains any one or a combination of filtering and treating materials which remove the bactericide. These materials may include charcoal metal particles such as disclosed in U.S. Pat. No. 4,642,192, or various other treating materials either singularly or in combination with each other. When the water tap is opened, the service water containing the bactericide passes through the housing and the material where the bactericide is removed, and the bactericide-free water is discharged therefrom through one or more conduits connected to the tap for ultimate usage.

The bactericides, such as chlorine, are typically added by the provider of the water, such as a municipality, to insure that the water which is delivered to the consumer is essentially bacteria free and meets standards for bacteria levels which have been established by various governmental agencies. In order to achieve this, levels of bactericides, such as chlorine, are added to the water by the provider of the water to insure that a sufficient amount of bactericide is present in the water transmission system right up to the point of final consumer use to prevent the growth of bacteria throughout the transmission system including the consumer's water service lines.

Where bactericide removal materials have been installed by the user upstream of the final point of use, the possibility exists that the portion of the system between the bactericide removal material and the ultimate point of use of the water, e.g. the water tap, may experience the growth of bacteria during periods of system shutdown due to the removal of the bactericide which was otherwise intended to prevent the growth of such bacteria. Such shutdown may occur for example when the user is away on extended vacation. If such growth occurs during shutdown, a potentially hazardous condition might exist upon resumption of use.

SUMMARY OF THE INVENTION

The system and method of the present invention eliminate the possibility of this potentially hazardous condition from occurring by reducing, if not eliminating all together, the possibility of bacterial growth in the portion of a water treatment system between the bactericide removal material and the point of use during periods of system shutdown, yet insures the delivery of bactericide free, fresh potable water during periods of normal use of the system.

In one principal aspect of the present invention, a water treatment system includes a material for the removal of bactericide from the water, a first conduit for communicating water containing the bactericide to the material and a second conduit for discharging the water from which the bactericide has been removed from the material. A cross connect communicates the first conduit with the second conduit. The cross connect blocks communication between the first and second conduits when water is flowing in the second conduit, but permits diffusion of the bactericide from the water containing the bactericide in the first conduit to the water from which the bactericide has been removed in the second conduit when the flow of water in the second conduit ceases.

In another principal aspect of the present invention, the aforementioned cross connect includes a check valve which closes to block communication between the first and second conduits when water is flowing in the second conduit, and opens to permit diffusion of the bactericide from the water containing the bactericide in the first conduit to the water from which the bactericide has been removed in the second conduit when the flow of water in the second conduit ceases.

In still another principal aspect of the present invention, the water in the first conduit has a given pressure and the water in the second conduit has a lesser pressure when the water is flowing through the second conduit, and the cross connect or check valve is closed by the differential in these pressures.

In still another principal aspect of the present invention, a method of preventing the growth of bacteria in a system for the treatment of water to remove a bactericide therefrom includes the steps of passing the water containing the bactericide through a material to remove the bactericide from the water, discharging the water from which the bactericide has been removed from the material, and diffusing at least some of the bactericide from the water containing the bactericide to the water from which the bactericide has been removed when the discharge of water from the material ceases.

In still another principal aspect of the present invention, the aforementioned method includes blocking the diffusion of bactericide when water is being discharged from the material.

In still another principal aspect of the present invention, the aforementioned blocking of diffusion is in response to a pressure differential between the water containing the bactericide and the water from which the bactericide has been removed when the water is flowing through the material.

In still another principal aspect of the present invention, the water is potable water.

In still another principal aspect of the present invention, the bactericide is a halogen, such as chlorine.

These and other objects, features and advantages of the present invention will become apparent upon consideration of the following detailed description of a preferred embodiment of the invention.

BRIEF DESCRIPTION OF THE DRAWINGS

For a more complete understanding of the present invention, reference will be made to the preferred embodiment illustrated in detail in the accompanying drawings in which.

DETAILED DESCRIPTION OF THE PREFERRED EMBODIMENT

Figure 1:
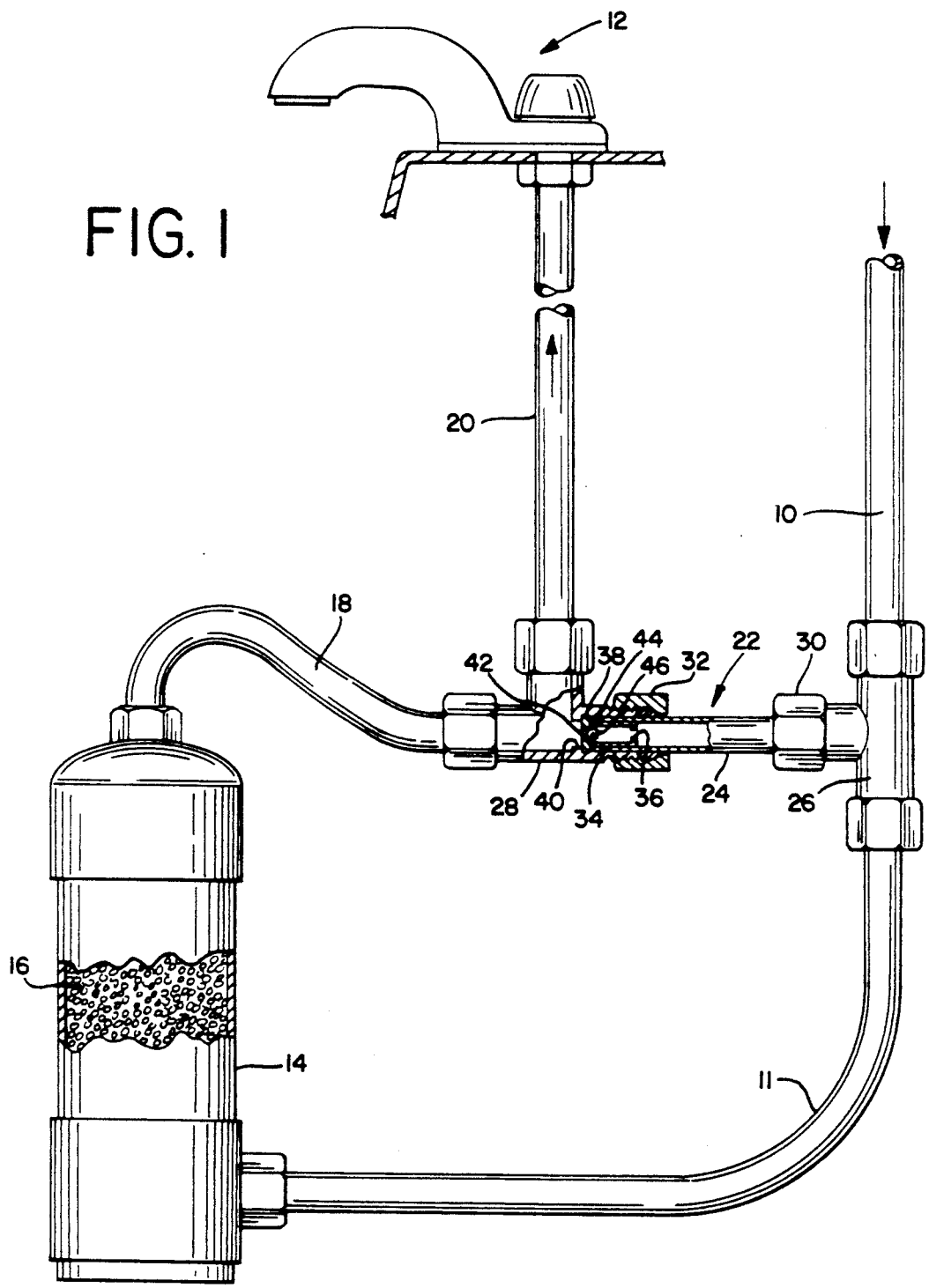
FIG. 1 is an overall, partially broken view of a preferred embodiment of water treatment system of the present invention and in which the method of the present invention may be practiced.

A preferred embodiment of system of the invention and for practicing the method of the invention is shown in FIG. 1. The system comprises a service conduit 10 for conducting potable water from a source of supply (not shown), such as a municipal water supply, to the ultimate point of use, such as a household water tap 12. As is typical in municipal water supplies, the water is treated with a bactericide by the municipality. The bactericide typically takes the form of a halogen, such as chlorine. The level of chlorine used is not only sufficient to kill most if not all bacteria which may be in the water at the municipal water treatment facility, but is also sufficient to maintain a level of chlorine in the water which leaves the facility to protect against bacterial growth in the municipality water transmission system, as well as in the individual user's plumbing system up to and including the point of use, e.g. the water tap 12.

These active bactericides, such as chlorine, which are in the water at the time of use impart undesirable attributes to the water, such as disagreeable odors and tastes. Thus, water treatment materials to remove these bactericides have been employed in recent years by the user adjacent the tap 12 from which the water is to be dispensed. Such materials are typically enclosed in a housing or cartridge 14 either beneath the counter of the user or on top of the counter and in the flow path of the water near the tap 12. As shown in FIG. 1, the service conduit 10 communicates via a conduit 11 with the water treatment material housing 14 so that the incoming water containing the bactericide enters the housing 14, passes through the water treatment material 16 therein and, after treatment by the material to remove the bactericide, the water is discharged from the housing 14 and material 16 through conduits 18 and 20 to the tap 12.

Thus, it will be appreciated that the water which fills conduits 18 and 20 and passes through the tap 12 is water which contains little or no bactericide the latter of which has been removed by the material 16 in the housing 14. Because of this, the conduits 18 and 20 and tap 12 are not protected from bacterial growth as they would otherwise be by the bactericide which is intentionally present in the service water in conduit 10. This does not generally pose a problem where the tap 12 is in frequent use. However, the absence of bactericide in conduits 18 and 20 could potentially pose a problem during periods of prolonged shutdown of the system, such as where the user is on extended vacation, because the possibility exists for the growth of bacteria in conduits 18 and 20 which could result in a potential health hazard when use is resumed. It is the purpose of the present invention to reduce, if not eliminate altogether such potential hazard.

Figure 2:
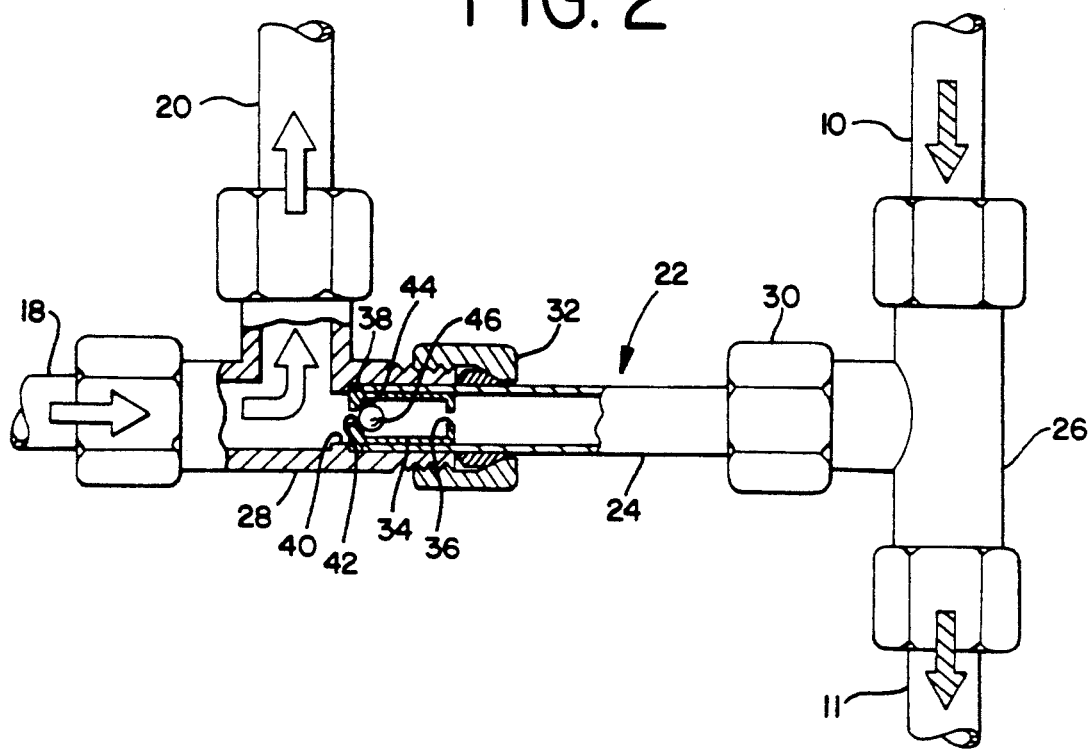
FIG. 2 is an enlarged, partially broken view of the system of FIG. 1 showing the system in a condition in which the system is in use and water is flowing through the system.
Figure 3:
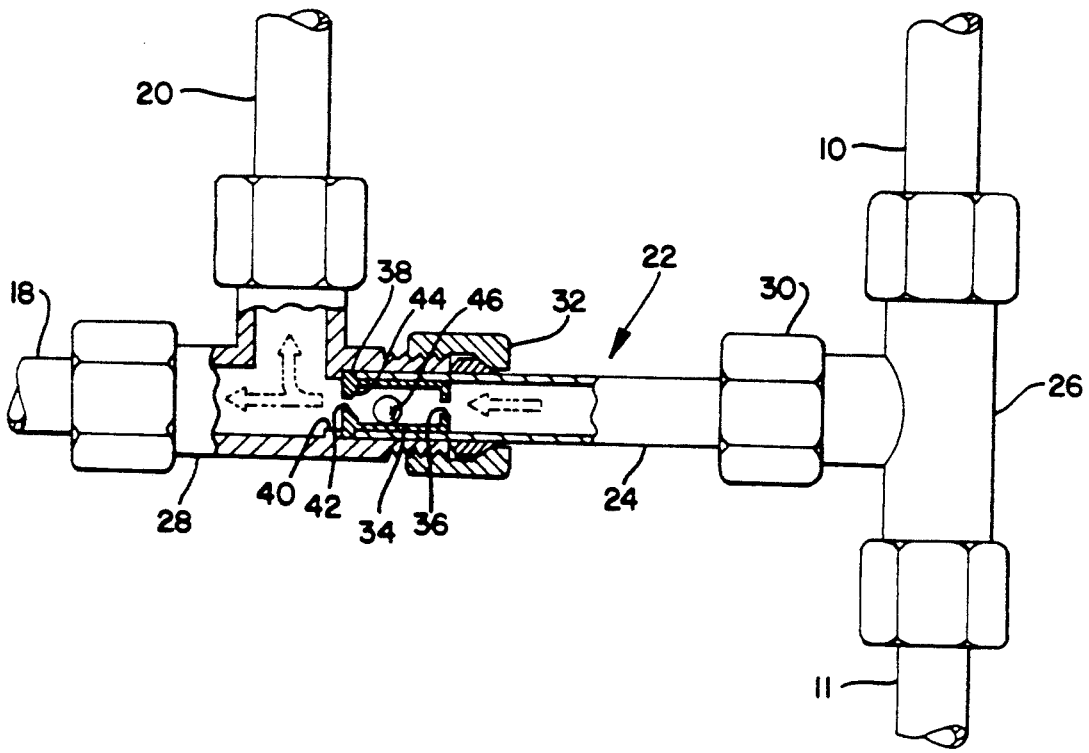
FIG. 3 is an enlarged, partially broken view of the system of FIG. 1 showing the system in a shutdown condition.

As shown in FIGS. 1-3, a cross connect, generally 22, is provided according to the invention which communicates between the service conduits 10 and 11 and the conduits 18 and 20. The cross connect 22 preferably comprises a conduit 24 which is coupled, such as by T-fittings 26 and 28, between the service conduits 10 and 11 and the conduits 18 and 20, respectively. Coupling may be accomplished by threaded couplers 30 and 32 as shown in the drawings. However, it will be appreciated that other suitable forms of coupling may be used other than the threaded couplings, such as soldered connections.

An elongate cylindrical sleeve 34 is inserted in the end of the cross connect conduit 24 adjacent the T-fitting 28. The sleeve 34 includes an orifice 36 at its upstream end for admission of bactericide containing water into the sleeve from the cross connect conduit 24. The other end of the sleeve 34 is closed by a flanged element 38 which preferably is formed integrally with the sleeve 34. The flanged element 38 preferably has a somewhat larger diameter than the outer diameter of the sleeve 34 so that the flanged element 38 is held firmly in position between a shoulder 40 on the T-fitting 28 and the end of the cross connect conduit 24 when the cross connect conduit is positioned in the T-fitting 28.

The flanged element 38 also includes a discharge orifice 42 surrounded on the inside of the sleeve 34 by an annular inclined valve seat 44 which is adapted to receive a moveable ball 46 in sealing relationship to the orifice 42 as shown in FIGS. 1 and 2. Both of the orifices 36 and 42 are smaller in diameter than the ball 46 so that the ball is retained in the sleeve 34 at all times. The ball 46 is slightly smaller in diameter than the inside diameter of the sleeve 34. By way of example, the inside diameter of the sleeve 34 may be about ⅛ in. and the diameter of the ball 46 about 3/32 in. Thus, the sleeve 34, flanged element 38 and ball 46 form a check valve which either blocks the communication of the water in cross connect conduit 24 from the water in T-fitting 28 or permits communication therebetween as will be described to follow.

As shown in FIG. 2, during conditions of normal use when water is being withdrawn from tap 12, water is supplied to the housing 14 and water treatment material 16 therein under normal municipal pressure through service conduits 10 and 11. As previously stated, this water contains a bactericide such as chlorine. This water passes through the water treatment material 16 in housing 14 where most if not all of the bactericide is removed, and the bactericide-free water is discharged from housing 14 and material 16 through conduit 18, T-fitting 28 and conduit 20 to the water tap 12 from which the bactericide-free water is discharged. The flow of water containing the bactericide is shown by the crosshatched arrows and of the bactericide-free water by the uncrosshatched arrows in FIG. 2.

As the water passes through the water treatment material 16, a slight pressure drop will result. Thereby, the pressure of the water in T-fitting 28 will be slightly less than the service pressure in conduits 10 and 11 and the cross connect conduit 24. This pressure differential will cause the ball 46 to seat on the valve seat 44 and block any flow of service water or its bactericide into the water flowing through the T-fitting 28.

When the tap 12 is shut and flow is stopped through the system, the pressure on each side of the ball 46 will equalize. This will cause the ball to fall away from the valve seat 44 by gravity, as shown in FIG. 3, and open communication between the water in cross connect conduit 24 which contains the bactericide and the water in T-fitting 28 from which the bactericide has been removed. This results in diffusion of the bactericide, as shown by the dot and dash arrows in FIG. 3, from the water in cross connect conduit 24 through the orifice 42 and into the water in T-fitting 28. Thus, the bactericide is diffused into the otherwise bactericide-free water in conduit 18, T-fitting 28, conduit 20 and the tap 12 during periods of system shutdown, and protection against bacterial growth in this portion of the system is achieved during this period.

When the tap 12 is again opened upon resumption of use, the water in conduit 18, T-fitting 28 and conduit 20 which contains the defused bactericide is quickly flushed from the system. The pressure drop in T-fitting 28 due to the water flow through the material 16 in housing 14 reestablishes a pressure differential which causes the ball 46 to reseat on the valve seat 44 blocking further communication and diffusion of the bactericide into the bactericide free water.

It will be understood that the embodiment of the present invention which has been described is merely illustrative of an application of the principles of the present invention. Numerous modifications may be made by those skilled in the art without departing from the true spirit and scope of the invention.

I claim:

1. A water treatment system comprising:
   a material for the removal of bactericide from the water;
   a first conduit for communicating water containing the bactericide to the material;
   a second conduit for discharging the water from which the bactericide has been removed from the material; and
   cross connect means communicating said first conduit with said second conduit, said cross connect means blocking communication between said first and second conduits when water is flowing in said second conduit, but permitting diffusion of the bactericide from the water containing said bactericide in said first conduit to the water from which the bactericide has been removed in said second conduit when the flow of water in said second conduit ceases.

2. The system of claim 1, wherein said cross connect means includes a check valve which closes to block communication between said first and second conducts and opens to permit diffusion of the bactericide from the water containing said bactericide in said first conduit to the water from which the bactericide has been removed in said second conduit when the flow of water in said second conduit ceases.

3. The system of claim 2, wherein the water in said first conduit has a given pressure and the water in said second conduit has a lesser pressure when said water is flowing through said second conduit, and said check valve is closed by the differential in said pressures.

4. The system of claim 2, wherein said check valve is a ball check valve.

5. The system of claim 1, wherein the water in said first conduit has a given pressure and the water in said second conduit has a lesser pressure when said water is flowing through said second conduit, and said cross connect means blocks communication between said conduits in response to the differential in said pressures.

6. The system of claim 1, wherein the bactericide is a halogen.

7. The system of claim 6, wherein the bactericide is chlorine.

8. The system of claim 3, wherein the bactericide is a halogen.

9. The system of claim 8, wherein the bactericide is chlorine.

10. The system of claim 1, wherein the water is potable water, and said second conduit includes a tap to selectively open and close said second conduit.

11. The system of claim 3, wherein the water is potable water, and said second conduit includes a tap to selectively open and close said second conduit.

12. The system of claim 11, wherein the bactericide is chlorine.

* * * * *